(12) United States Patent
Kimura et al.

(10) Patent No.: US 7,717,336 B2
(45) Date of Patent: May 18, 2010

(54) INFORMATION TERMINAL DEVICE, METHOD, AND COMPUTER READABLE MEDIUM STORING PROGRAM

(75) Inventors: Tetsuya Kimura, Kanagawa (JP); Tadashi Shimizu, Kanagawa (JP); Kensuke Ito, Kanagawa (JP); Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 571 days.

(21) Appl. No.: 11/714,245

(22) Filed: Mar. 6, 2007

(65) Prior Publication Data
US 2007/0228167 A1 Oct. 4, 2007

(30) Foreign Application Priority Data
Apr. 3, 2006 (JP) ............... 2006-101381

(51) Int. Cl.
*G06K 5/00* (2006.01)
*G07D 11/00* (2006.01)

(52) U.S. Cl. .................. 235/380; 235/375; 235/379

(58) Field of Classification Search ................. 235/380, 235/375, 379, 383, 382, 492, 486
See application file for complete search history.

(56) References Cited

U.S. PATENT DOCUMENTS 5,841,886 A * 11/1998 Rhoads ................ 382/115
6,026,188 A * 2/2000 Dionysian .............. 382/216
6,111,517 A * 8/2000 Atick et al. ............. 340/5.83
6,917,691 B2 * 7/2005 Evans et al. ............ 382/100
7,190,816 B2 * 3/2007 Mitsuyu et al. .......... 382/124
7,234,645 B2 * 6/2007 Silverbrook et al. ...... 235/494
7,254,548 B1 * 8/2007 Tannenbaum ............ 705/18
7,433,498 B2 * 10/2008 Sanse et al. ............ 382/115
2002/0178124 A1 * 11/2002 Lewis ................... 705/67
2003/0115459 A1 * 6/2003 Monk ................... 713/168

FOREIGN PATENT DOCUMENTS

JP  A 2003-317100  11/2003
JP  A 2005-38389   2/2005

* cited by examiner

*Primary Examiner*—Thien M Le
(74) *Attorney, Agent, or Firm*—Oliff & Berridge, PLC

(57) ABSTRACT

An information terminal device includes an acquisition unit that acquires reference information representing a machine-readable feature distributed on a surface of a thing associated with a first user, and collation information representing a machine-readable feature distributed on a surface of a thing associated with a second user, a registration unit that registers the reference information acquired by the acquisition unit from the thing associated with the first user in a storage unit, a collation unit that uses the collation information acquired by the acquisition unit from the thing associated with the second user, and collates the collation information with the reference information, and a judgment unit that judge validity of whether the second user is the first user, based on a result of collation by the collation unit.

10 Claims, 6 Drawing Sheets

| REGISTRATION NUMBER | FILE | REGISTRATION DATE |
|---|---|---|
| 1 | 00000001.dat | 2000.10.1, 07:00 |
| 2 | 00000002.dat | 2000.10.1, 07:10 |
| 3 | 00000003.dat | 2000.12.24, 22:35 |
| ⋮ | ⋮ | ⋮ |

INFORMATION TERMINAL DEVICE, METHOD, AND COMPUTER READABLE MEDIUM STORING PROGRAM

CROSS-REFERENCE TO RELATED APPLICATIONS

This and claims priority under 35 USC 119 from Japanese application is based on Patent Application No. 2006-101381 filed Apr. 3, 2006.

BACKGROUND

1. Technical Field

The present invention relates to an information terminal device used as the personal authentication 2. Related Art Some information terminal devices represented by a cellular phone, a portable type (including notebook type) personal computer, and a PDA (Personal Digital Assistant) are provided with the function of personal authentication in order to prevent unauthorized access to confidential information and personal information, wrong connection to the Internet, and improper usage of pay contents.

SUMMARY

According to an aspect of the invention, there is provided an information terminal device including an acquisition unit that acquires reference information representing a machine-readable feature distributed on a surface of a thing associated with a first user, and collation information representing a machine-readable feature distributed on a surface of a thing associated with a second user, a registration unit that registers the reference information acquired by the acquisition unit from the thing associated with the first user in a storage unit, a collation unit that uses the collation information acquired by the acquisition unit from the thing associated with the second user, and collates the collation information with the reference information, and a judgment unit that judge validity of whether the second user is the first user, based on a result of collation by the collation unit.

BRIEF DESCRIPTION OF THE DRAWINGS

Exemplary embodiments of the present invention will be described in detail on the basis of the following figures, wherein.

DETAILED DESCRIPTION

Concrete exemplary embodiments of the present invention will be hereunder explained in detail in reference to the drawings.

Figure 1:
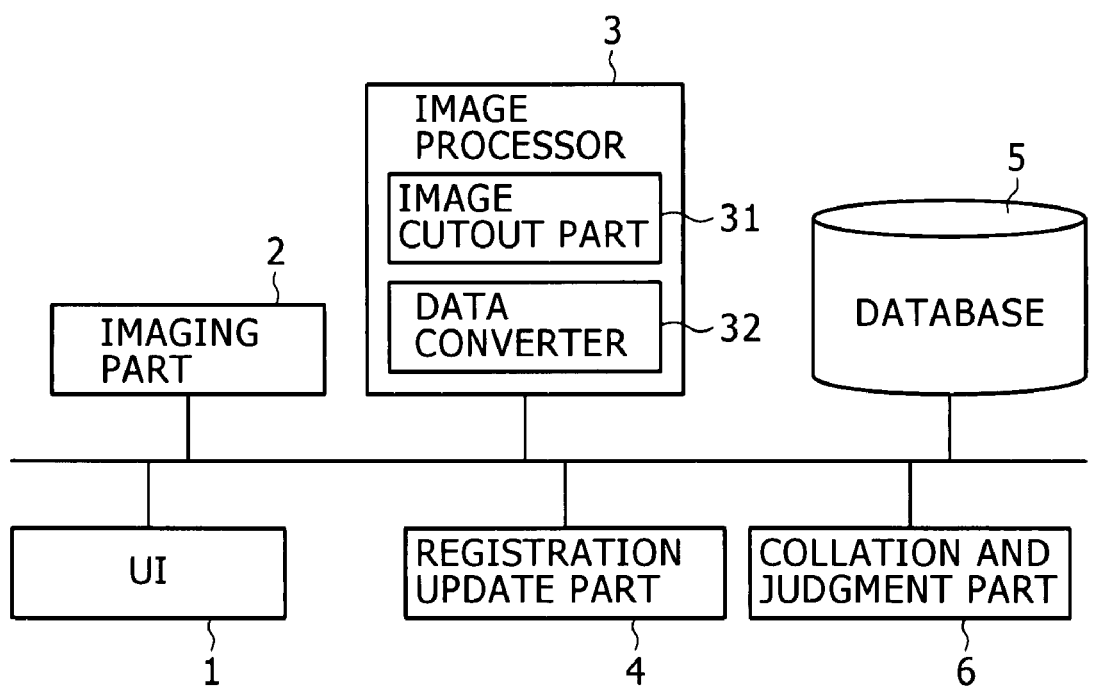
FIG. 1 is a block diagram showing an example of the configuration of an information terminal device according to an exemplary embodiment of the present invention.

FIG. 1 is a block diagram showing an example of the configuration of an information terminal device according to an exemplary embodiment of the present invention. Here, in the present exemplary embodiment, explanations are made on the basis of the case where the information terminal device is a cellular phone equipped with a camera. Note that the present invention can be applied widely not only to a cellular phone but also to overall information terminal devices including portable information terminals such as a portable personal computer (including a notebook personal computer), a PDA, and the like.

In FIG. 1, a UI 1 is a part that is used as a user interface when a user inputs various kinds of information and various kinds of information is displayed for the user. The UI 1 includes a display including a liquid crystal display or an organic EL (electroluminescent) display and others, and an operating part including buttons and switches for character entry and operation.

A imaging part 2 is a part to generate image data of an object through photographing. The imaging part 2 includes, for example, a compact digital camera equipped with an imaging module such as a CCD (Charge Coupled Device) sensor or a CMOS sensor, and a lens module. Further, the imaging part 2 is provided with a flash function to irradiate an object with light at photographing, and a close-up shooting (macro-shooting) function that allows focusing even when an object comes close up to several centimeters. Among those functions, with regard to the close-up shooting function, a dedicated adapter (a magnifying lens set and a lighting source) for close-up shooting may be mounted on the information terminal device.

An image processor 3 is a part that applies image processing to image data captured by the imaging part 2 and constitutes an acquisition unit together with the imaging part 2. The image processor 3 has various image processing functions (for example, compression and expansion processing of an image by the JPEG format, image rotating processing, generation of thumbnail data, and others), and includes an image cutout part 31 and a data converter 32 therein. The image cutout part 31 is a unit that cuts out image data input from the imaging part 2 into a prescribed region size.

The data converter 32 includes a signal processing circuit (an analog-digital conversion circuit) to convert analog image data cut out by the image cutout part 31 into digital data. Further, the data converter 32 includes an encryption processing circuit to encrypt and decrypt the digital image data converted by the signal processing circuit with a private key and a public key paired with each other.

A registration update part 4 is a unit to execute the processes of registering reference image data (reference information) captured in order to execute personal authentication (personal identification) of a user in a database 5 functioning as a storage unit, and deleting already registered reference image data from the database 5.

The database 5 includes a non-volatile memory, more specifically a flash memory or the like, incorporated into the information terminal device. In the database 5, besides the reference image data, various data and programs necessary for the information terminal device are stored.

A collation and judgment part 6, in order to execute personal authentication of a user, collates collation image data (collation information) newly captured by the imaging part 2 and the image processor 3 with reference image data (reference information) registered beforehand in the database 5 by the registration update part 4, and thereby judges the validity of the user (judges whether or not the user whose collation image data is captured by photographing with the imaging part 2 coincides with the true user).

Successively, processing executed in an information terminal device will be explained. Here, each processing described below is executed, for example, when an information terminal device includes a computer equipped with a CPU (Central Processing Unit), a ROM (Read-Only Memory), and a RAM (Random Access Memory), by retrieving a program stored in the ROM to the RAM by the CPU.

Figure 2:
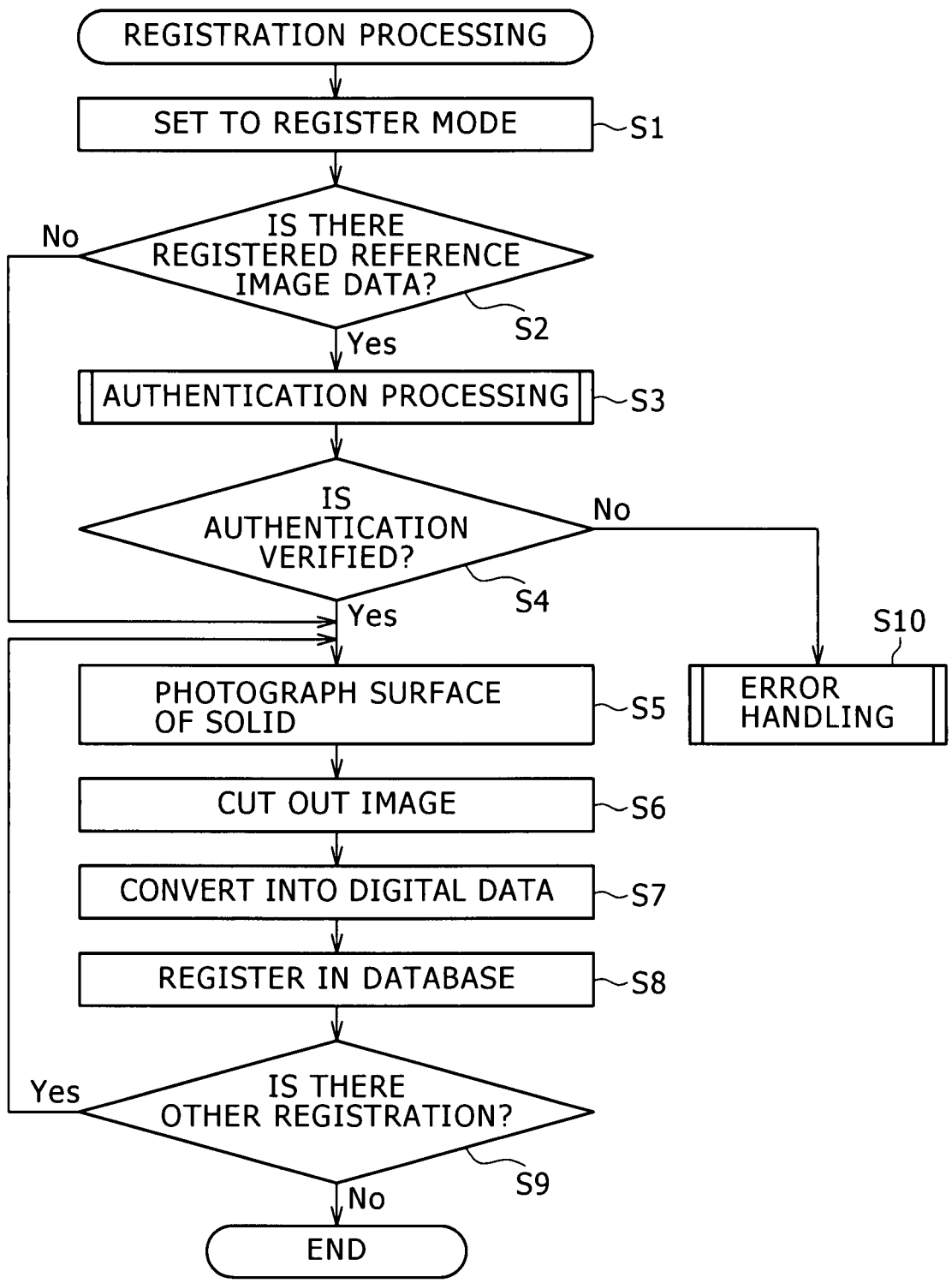
FIG. 2 is a flowchart showing the sequence of registration processing.

FIG. 2 is a flowchart showing processing sequence (a method) when reference image data for personal authentication are registered in an information terminal device. Firstly, a user of an information terminal device (a cellular phone equipped with a camera) sets the operational mode of the information terminal device to a register mode by the operation of buttons or the like of the UI 1, and then the registration update part 4 confirms whether or not reference image data is registered in the database 5 (Steps S1 and S2). On this occasion, if at least one group of reference image data is registered in the database 5, the authentication processing of the user is executed with the reference image data (Step S3). Then if the authentication is approved, the user who has performed the setting operation of the register mode is regarded as the true user and the processing advances from Step S4 to Step S5. In contrast, if no reference image data is registered in the database 5 at Step S2, the authentication processing is skipped and the processing advances to Step S5.

Figure 3:
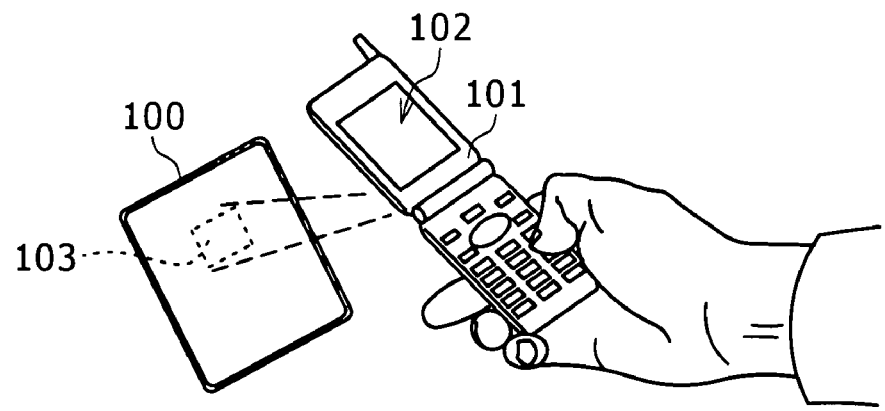
FIG. 3 is a view showing the image of shooting the surface of a solid.

At Step S5, as shown in FIG. 3, an information terminal device (a cellular phone equipped with a camera) 101 is brought close to a solid 100 possessed by a true user at a prescribed distance from the solid 100 (hereunder referred to as "a shooting distance") and image data of the surface of the solid 100 is captured by shooting the surface of the solid 100 with the imaging part 2. With regard to a shooting distance, a distance thought to be appropriate for the registration of reference image data may be indicated to a user at the shooting. For example, when an appropriate shooting distance is 5 cm, the conditions of photographing may be indicated to a user by displaying a message such as "Shoot an object at a distance of about 5 cm" on a liquid crystal panel 102 functioning as the display of the UI 1.

Figure 4:
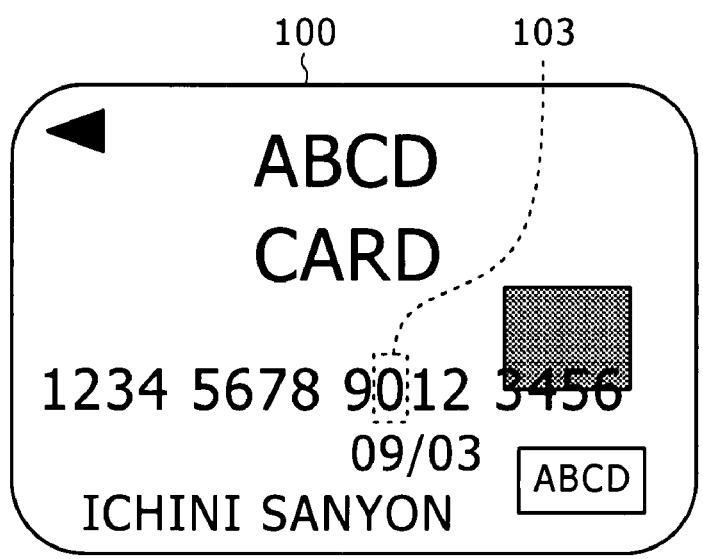
FIG. 4 is a view showing a concrete example of a solid as an object of photographing.

Further, as a solid 100 possessed by a user to be a shooting object, any solid may be used as long as the solid is a solid on the surface of which a mechanically readable feature having randomness distributes. The mechanically readable feature means asperities on the surface of a solid or a dot pattern formed on the surface of a solid. Therefore, as a solid possessed by a user, a desired solid may be selected from among goods usually carried or worn by the user, for example, a wallet, a key holder, a wristwatch band, a name card, a card case, a belt, a ring, clothes, a card and the like, a custom-made paper, and a custom-made seal. On this occasion, a user can freely decide the part, of the surface of the solid 100, used as the region 103 to be shot. When the solid 100 selected as the shooting object by a user is such a credit card as shown in FIG. 4 for example, the user decides a part of the surface as the region 103 to be shot and shoots the region 103 with the imaging part 2.

Furthermore, in the case where the operational mode of the information terminal device is set to the register mode at Step S1, the flash function and the close-up shooting function of the imaging part 2 may be automatically set to on-state (an activated state) when the surface of a solid possessed by a user is shot with the imaging part 2 at Step S5. On this occasion, by activating the flash function, the object (the solid possessed by the user) is irradiated with flash light at the shooting. Thereby the surface of the solid can be photographed in constant brightness corresponding to the flash light quantity. Further, in the case where the solid possessed by a user is a credit card as stated above, the light reflected by the surface of the solid when the solid is irradiated with flash light is read by a CCD sensor, a CMOS sensor, or the like and thereby image data representing the feature distributing on the solid is generated. Then in the case where the solid is a substance having optical transparency (a transparent or translucent film or the like) for example, image data representing the feature distributing on the solid may be generated by reading the light permeating the surface of the solid with a sensor.

Successively, the image data obtained through the photographing with the imaging part 2 as stated above is sent to the image processor 3, the image cutout part 31 cuts out the image, and the data converter 32 converts the image data into digital data (Steps S6 and S7). On this occasion, the image cutout part 31 cuts out the image data captured by the imaging part 2 into a predetermined first region size. When the resolution of the imaging part 2 is 400 dpi in length and width for example, the image cutout part 31 cuts out the image data in the center of the region 103 to be photographed into the region size of 32 dots×32 dots (about 2 mm×about 2 mm).

Further, the data converter 32 converts the image data cut out by the image cutout part 31 into digital data of prescribed tones. When it is assumed that the tone value of each pixel (dot) is expressed in the range of 0 to 255 (256 tones) for example, the data converter 32 converts the analog image data cut out by the image cutout part 31 into digital data of 8-bit gray scale. In this way, the digitized image data becomes intrinsic feature information representing a mechanically readable feature having randomness, such as asperities on the surface of a solid or a dot pattern formed on the surface of a solid, the solid being possessed by a true user.

Figures 5, 6:
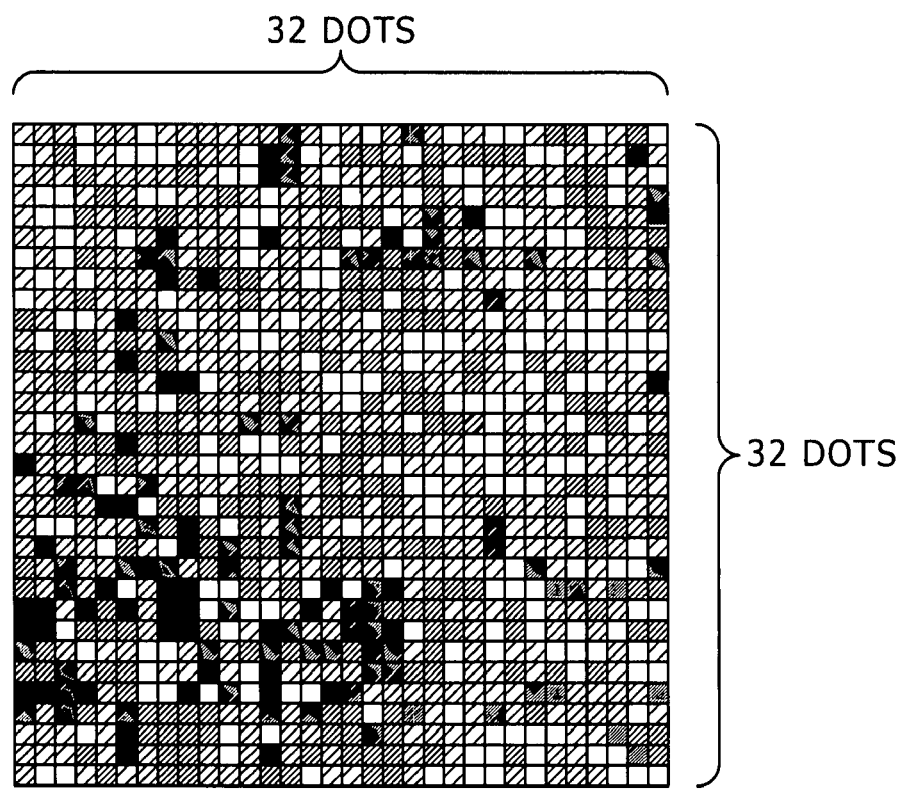
FIG. 5 is an imaginary view visualizing an example of reference image data.
FIG. 6 is a table showing an example of registration of reference image data.

Successively, the registration update part 4 registers the image data subjected to image processing at the image processor 3 (the digital data) in the database 5 as reference image data (reference information) (Step S8). FIG. 5 is an imaginary view visualizing an example of reference image data. At the image processor 3, prior to the registration in the database 5, the image data subjected to data conversion (digitized) at the data converter 32 may be encrypted with a private key at an encryption processing circuit. Further, registration numbers (sequence numbers) of positive integers starting from number one are given to groups of reference image data registered in the database 5 in a one-on-one relationship. Consequently, when new reference image data is registered in the database 5 in the state where three groups of reference image data corresponding to numbers one to three are already registered in the database 5 as shown in FIG. 6 for example, the registration number four is given to the newly registered reference image data. Incidentally, in the example shown in FIG. 6, a file of reference image data is registered for each registration number in a manner of being linked to the registration date of the reference image data (attribute information).

Successively, whether or not the user has another solid (a possession) to be registered as other reference image data is asked to the user at the UI 1 (Step S9). Then, when the user has another solid to be registered, the processing goes back to Step S5 and, when the user does not have another solid to be registered, the series of the registration processing is terminated at the time. Further, when authentication has not been approved at the authentication processing of Step S3, the processing moves from Step S4 to Step S10 and error handling is executed. In the error handling, for example, the process of displaying the fact that the user has not been authenticated as the true user in the authentication processing as a message on the display of the UI 1 is executed.

Figure 7:
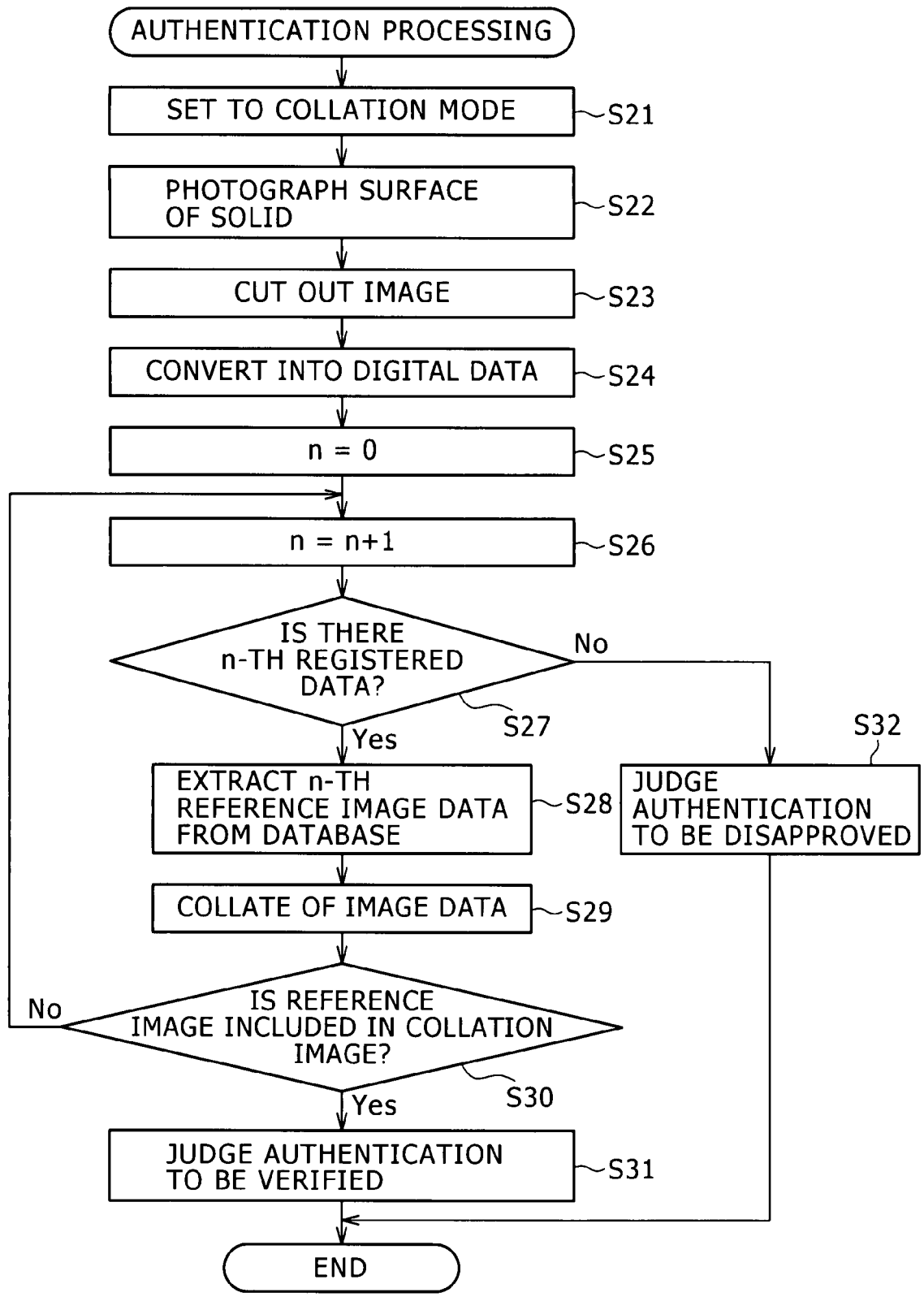
FIG. 7 is a flowchart showing the sequence of authentication processing.

FIG. 7 is a flowchart showing processing a sequence (a method) when personal authentication is executed in an information terminal device. Firstly, when a user of an information terminal device (a cellular phone equipped with a camera) intends to carry out processing requiring personal authentication through buttons or the like of the UI 1, the collation and judgment part 6 sets the operational mode of the information terminal device to the collation mode and displays the message to encourage the photographing of a collation image on the display of the UI 1 (Step S21). In the event of the setting of the collation mode too, the flash function and the close-up shooting function of the imaging part 2 may be automatically set to on-state (an activated state) in the same way as the case of the setting of the register mode.

Successively, in the same way as the case of registration, the imaging part 2 of the information terminal device is brought close to a solid possessed by a user and the surface of the solid is shot with the imaging part 2, and thereby image data is captured by the imaging part 2 (Step S22). The user in this case is the user to be the object of the judgment of personal authentication. Thereafter, the image data obtained through photographing with the imaging part 2 is sent to the image processor 3, the image cutout part 31 cuts out the image there, and the data converter 32 converts the image data into digital data (Steps S23 and S24).

On this occasion, the image cutout part 31 cuts out the image data input from the imaging part 2 into a second region size that has been determined beforehand. The second region size is set larger than the first region size. Assuming that the first region size is 32 dots×32 dots (about 2 mm×about 2 mm) as stated above for example, the second region size is set at the size of 64 dots×64 dots (about 4 mm×about 4 mm) corresponding to twice as large as the first region size.

Meanwhile, the data processor 32 converts the image data cut out by the image cutout part 31 into digital data of the same tone as the data at the registration. Assuming that the image data is converted into digital data of 256 tones at registration as stated above for example, the data converter 32 converts the analog image data cut out by the image cutout part 31 into digital data of 8-bit gray scale in the same way as the registration. By so doing, the digitized image data become intrinsic feature information representing a mechanically readable feature having randomness, such as asperities on the surface of a solid or a dot pattern formed on the surface of a solid, the solid being possessed by a user as the judgment object. The feature information thus obtained is stored (memorized) as collation image data (collation information) in a first memory region of a built-in memory (a flash memory or the like) not shown in the figure.

Successively, the collation and judgment part 6 resets the value of the variable n at zero (Step S25) and thereafter the value of n increases by one (Step S26). Thereafter, the collation and judgment part 6 checks whether or not n-th reference image data is registered in the database 5 (Step S27) and, when n-th reference image data is registered, the n-th reference image data is extracted from the database 5 and stored in a second memory region of the built-in memory not shown in the figure (Step S28). On this occasion, when the reference image data extracted from the database 5 is encrypted, the reference image data is decrypted with a public key at the encryption processing circuit of the image processor 3 and thereafter stored in the second memory region.

Successively, the collation and judgment part 6 collates the collation image data stored in the first memory region of the built-in memory as stated above with the reference image data stored in the second memory region of the built-in memory (Step S29). In this case, the collation image data has a region size of 64 dots×64 dots (about 4 mm×about 4 mm) and the reference image data has a region size of 32 dots×32 dots (about 2 mm×about 2 mm). In the event of the collation between the two groups of the image data, the collation and judgment part 6 sets a window (a window for the extraction of image data) of the same size as the region size of the reference image data in the region of the collation image data in order to sequentially extract image data having the same size as the region size of the reference image data from the collation image data. While the position of the window is moved by one dot at a time from the upper left corner to the lower right corner in the region of the collation image data, the collation image data contained in the window is extracted at each of the positions and a correlation value showing the similarity between the extracted collation image data and the reference image data is computed.

To the computation of a correlation value, the known normalized correlation method can be applied as a method for obtaining the similarity between the two groups of the image data. Further, the movement of the window includes the movement in the lateral direction and the movement in the vertical direction and the window moves by one dot at a time in each direction. Further, the movement in the vertical direction is started after the completion of the movement in the lateral direction. Consequently, when the window is set at the size of 32 dots×32 dots in the same way as the reference image data in the collation image data cut out at the size of 64 dots×64 dots, the window moves once in the vertical direction every time after the window moves 32 times (by 32 dots) in the lateral direction. Then, the window moves 32 times in total in the vertical direction. In addition, the collation and judgment part 6 repeats the computation of the correlation values with the frequency corresponding to the frequency of the movement of the window. On this occasion, by computing the correlation values in the same way as described above in the states of relatively shifting the rotation angles between the collation image data and the reference image data by 0, 90, 180, and 270 degrees through the rotation processing of the images, it is possible to appropriately collate the collation image data with the reference image data without being influenced by the orientation (the vertical or lateral orientation, or the like) of an object when the object is shot with the imaging part 2.

Successively, the collation and judgment part 6 judges whether or not the reference image data is included in the image region of the collation image data on the basis of the collation result (Step S30). Specifically, the maximum correlation value is extracted from among plural correlation values obtained through the repetition of the computation and, when the maximum correlation value is not lower than a prescribed threshold value, the reference image data is judged to be included in the image region of the collation image data and, when the maximum correlation value is lower than a prescribed threshold value, the reference image data is judged not to be included in the image region of the collation image data.

Further, besides that, whether or not the reference image data is included in the image region of the collation image data may be judged by comparing the maximum correlation value obtained through the repetition of the computation accompanying the movement of the window with a threshold value wherein a normalized score of the maximum correlation value is set beforehand. That is, when the maximum correlation value is not lower than a first threshold value and the normalized score of the maximum correlation value is not lower than a second threshold value, the reference image data is judged to be included in the image region of the collation image data and, when the maximum correlation value is lower than a first threshold value or the normalized score of the maximum correlation value is lower than a second threshold value, the reference image data is judged not to be included in the image region of the collation image data.

Furthermore, when the reference image data is judged to be included in the image region of the collation image data at Step S30, the user subjected to photographing to capture the collation image data is regarded as the true user and the authentication is verified (Step S31) and thereafter the series of the authentication processing is terminated. In contrast, when the reference image data is judged not to be included in the image region of the collation image data at Step S30, the processing goes back to Step S26 and the value n increases by one. Then, when n-th reference image data is not registered in the database 5 at the succeeding Step S27, the user subjected to photographing to capture the collation image data is regarded as a false user, the authentication is rejected (Step S32), and thereafter the series of the authentication processing is terminated.

By so doing, for example, when authentication processing is carried out in order to register reference image data in the database 5 as stated above, the registration of the reference image data is accepted only when the authentication is verified at the authentication processing. Further, when authentication processing is carried out in order to unlock some sort of lock in operation, the lock is unlocked only when the authentication is verified at the authentication processing. Furthermore, when authentication processing is carried out in order to access pay contents in the Internet, the access to the pay contents is approved only when the authentication is verified at the authentication processing.

Figure 8:
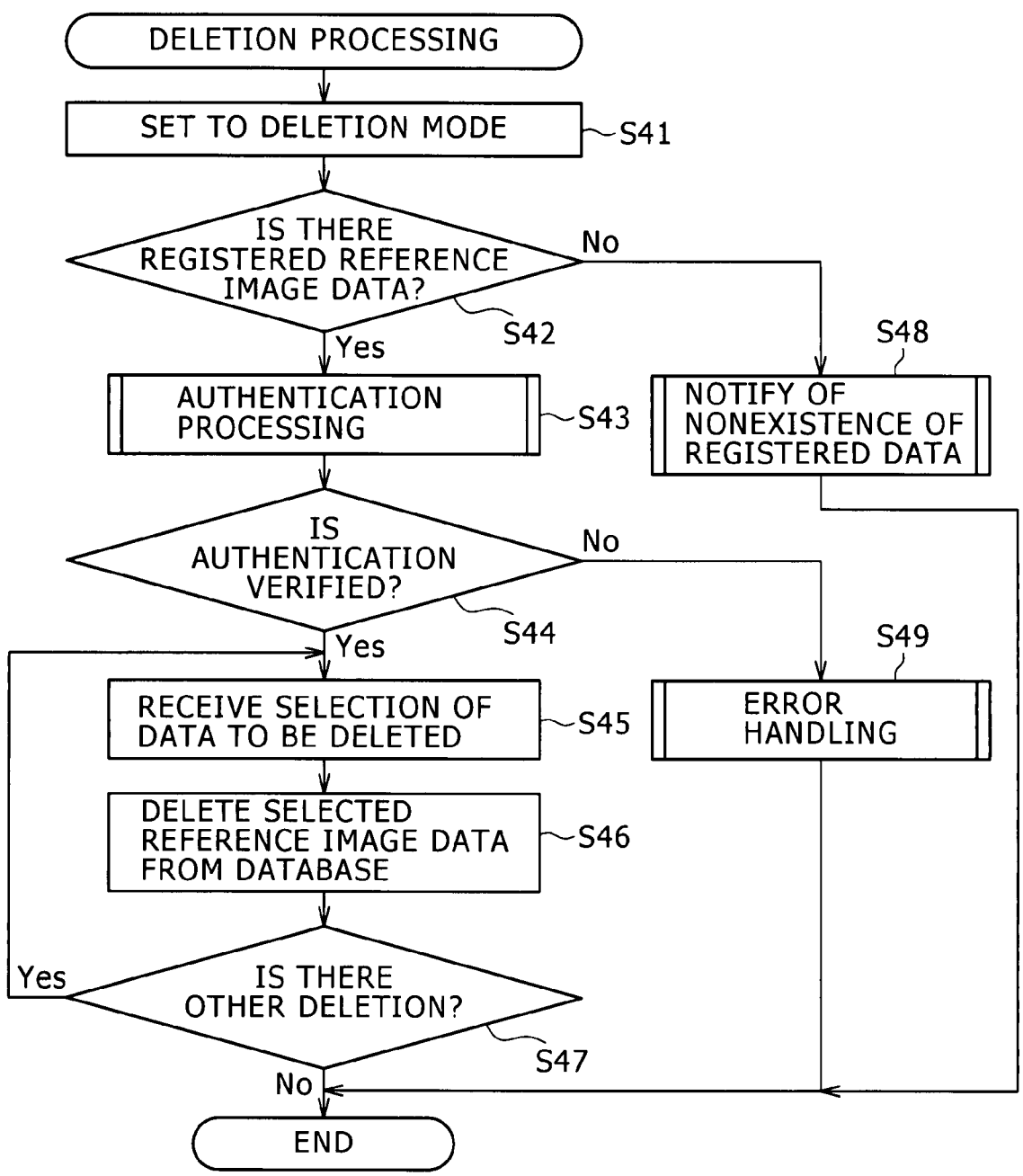
FIG. 8 is a flowchart showing the sequence of deletion processing.

FIG. 8 is a flowchart showing a processing sequence (a method) when reference image data for personal authentication is deleted in an information terminal device. Firstly, a user of an information terminal device (a cellular phone equipped with a camera) sets the operational mode of the information terminal device to the mode to delete reference image data by operating buttons of the UI 1 and the like, and then the registration update part 4 confirms whether or not reference image data is registered in the database 5 (Steps S41 and S42). On this occasion, if at least one group of reference image data is registered in the database 5, the authentication processing for the user is executed with the reference image data (Step S43). Then if the authentication is verified, the processing advances from Step S44 to Step S45.

At Step S45, the reference image data registered in the database 5 is displayed as a list on the display of the UI 1 and the selection of the data to be deleted is received by the operation section of the UI 1. Then, when a user selects the data to be deleted, the registration update part 4 deletes the reference image data selected by the user to be deleted from the database 5 (Step S46).

Successively, whether or not the user has another group of reference image data to be deleted is asked to the user at the UI 1 (Step S47). Then, when the user has another group of reference image data to be deleted, the processing goes back to Step S45 and, when the user does not have another group of reference image data to be deleted, the series of the deletion processing is terminated there. Further, when none of the reference image data is registered in the database 5 at Step S42, the user is notified of the fact through message display or the like of the UI 1 (Step S48), and the deletion processing is terminated. Further, when the authentication is not approved in the authentication processing at Step S43, the processing moves from Step S44 to Step S49 and error handling is executed. In the error handling, for example, the process of displaying the fact that the user has not been authenticated as the true user in the authentication processing as a message on the display of the UI 1 is executed.

In an information terminal device according to an exemplary embodiment of the present invention as stated above, validity of a user is judged by, in registration processing, obtaining image data representing a feature intrinsic to a solid possessed by a true user from the solid and registering the image data as reference image data in the database 5, and, in authentication processing, obtaining image data representing a feature intrinsic to a solid possessed by a user to be judged from the solid, using the image data as collation image data, and collating the collation image data with the reference image data registered in the database 5. As a result, it is possible to easily adjust the photographing conditions under which image data is captured from a solid possessed by a user between the occasion of registration and the occasion of authentication (collation). Consequently, when a user is a true user, the user can be authenticated rapidly and surely with the solid used at registration. As a result, the burden incurred by a user can be reduced. Further, the time required up to authentication can be shortened.

Further, since only a true user knows what part of the image of the surface of a solid possessed by the true user is captured with an information terminal device when reference image data are registered in the database 5, even if the solid used for the registration of the reference image data falls into the hands of a fraudulent outsider (a false user) together with the information terminal device, the authentication is not approved as a result of the collation of the image data unless the same part as shot at the registration is shot. Therefore, the fear that an outsider is wrongly authenticated as a true user is completely dismissed. As a consequence, the improvement in the area of security can be expected.

Furthermore, since plural groups of image data obtained from plural solids possessed by a true user can be registered as plural groups of reference image data respectively in the database 5, by carrying or wearing at least one solid among the solids of which the reference image data is already registered in the database 5, it is possible to get personal authentication with the solid. As a result, customer convenience can be enhanced.

Additionally, by setting an information terminal device to a deletion mode and getting personal authentication, it is possible to delete reference image data already registered in the database 5. By so doing, it is possible to selectively delete the reference image data of a solid that is no longer routinely carried or a solid that is lost from among the groups of the reference image data of the solids used for the registration of reference image data in the registration processing in accordance with the demand of a user after the registration.

In addition, in the registration processing and the deletion processing, the registration of new reference image data or the deletion of already registered reference image data is approved only when the collation and judgment part 6 judges a user to be a true user. Hence it is possible to allow only a true user to register or delete reference image data in the state where the reference image data are registered in the database 5.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information terminal device, comprising:
   an acquisition unit that acquires reference information representing a machine-readable feature distributed on a surface of a physical medium that is associated with, but not connected to, a first user that is presented to the information terminal device, and collation information representing a machine-readable feature distributed on a surface of a physical medium that is associated with, but not connected to, a second user that is presented to the information terminal device;
   a registration unit that registers the reference information acquired by the acquisition unit from the physical medium associated with the first user in a storage unit;
   a collation unit that uses the collation information acquired by the acquisition unit from the physical medium associated with the second user, and collates the collation information with the reference information; and
   a judgment unit that judges a validity of whether the second user is the first user, based on a result of collation by the collation unit.

2. The information terminal device according to claim 1, wherein the acquisition unit includes a photographing unit that generates image data functioning as the reference information and the collation information by reading light that is reflected on the surface of the thing or penetrates the solid when the thing is irradiated with light.

3. The information terminal device according to claim 1, wherein pieces of the reference information acquired by the acquisition unit from a plurality of physical media associated with, but not connected to, the first user can be registered in the storage unit as pieces of the reference information respectively.

4. The information terminal device according to claim 1, wherein the registration unit that deletes the reference information registered by registration unit in the storage unit.

5. The information terminal device according to claim 1, wherein the registration unit that decides approval or disapproval of registration of a new piece of the reference information or deletion of the relevant already registered piece of the reference information based on the validity of the user judged by collation of the one or more pieces of the reference information and the collation information.

6. The information terminal device according to claim 1, wherein the collation unit obtains a correlation value showing similarity between the collation information and the reference information, and collates the collation information with the reference information on the basis of the correlation value.

7. The information terminal device according to claim 6, wherein
   a size of a region of the reference information is smaller than a size of a region of the collation information; and
   the collation unit sets a window of the same size as the region of the reference information in the region of the collation information, moves a position of the window in the region of the collation information while repeatedly computing the correlation value showing the similarity between the collation information and the reference information extracted at each of the window positions, and collates the collation information with the reference information on the basis of the correlation value.

8. The information terminal device according to claim 1, wherein the machine-readable feature is asperities of the surface of the physical medium or a dot pattern formed on the surface of the physical medium.

9. A computer readable medium storing a program causing a computer to execute a process, the process comprising:
   acquiring reference information representing a machine-readable feature distributed on a surface of a physical medium that is associated with, but not connected to, a first user that is presented to a machine;
   registering the reference information;
   acquiring collation information representing a machine-readable feature distributed on a surface of a physical medium that is associated with, but not connected to, a second user that is presented to the machine;
   collating collation information with the reference information; and judging a validity of whether the second user is the first user, based on a result of the collation.

10. A personal authentication method, comprising:
    acquiring reference information representing a machine-readable feature distributed on a surface of a physical medium that is associated with, but not connected to, a first user that is presented to the machine;
    registering the reference information;
    acquiring collation information representing a machine-readable feature distributed on a surface of a physical medium associated with, but not connected to, a second user and is presented to a machine;
    collating collation information with the reference information; and judging a validity of whether the second user is the first user, based on a result of the collation.

* * * * *